United States Patent
Robertson et al.

(10) Patent No.: US 10,673,816 B1
(45) Date of Patent: Jun. 2, 2020

(54) LOW DELAY NETWORK INTRUSION PREVENTION

(71) Applicant: Vencore Labs, Inc., Basking Ridge, NJ (US)

(72) Inventors: Seth Robertson, Basking Ridge, NJ (US); Frederick Porter, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 189 days.

(21) Appl. No.: 15/482,341

(22) Filed: Apr. 7, 2017

(51) Int. Cl.
*H04L 29/06* (2006.01)
*G06F 21/50* (2013.01)

(52) U.S. Cl.
CPC ...... *H04L 63/0245* (2013.01); *H04L 63/0254* (2013.01); *H04L 63/1416* (2013.01); *H04L 63/1425* (2013.01); *H04L 63/1458* (2013.01); *G06F 21/50* (2013.01); *H04L 63/20* (2013.01)

(58) Field of Classification Search
CPC ............. H04L 63/0245; H04L 63/0254; H04L 63/1416
See application file for complete search history.

(56) References Cited

U.S. PATENT DOCUMENTS

| | | | |
|---|---|---|---|
| 6,826,148 B1 * | 11/2004 | Lee ......................... | H04L 45/22 370/230 |
| 7,546,471 B2 * | 6/2009 | Phillips ................. | G06F 21/564 713/188 |
| 7,853,578 B1 * | 12/2010 | Anker ...................... | G06F 7/02 707/706 |
| 8,458,796 B2 * | 6/2013 | Stites ................... | H04L 63/1416 726/23 |
| 9,591,015 B1 * | 3/2017 | Amin ................... | H04L 63/1416 |

(Continued)

OTHER PUBLICATIONS

Wu, Zheng; Xiao, Debao; Xu, Hui; Peng, Xi; Zhuang, Xin; "Virtual Inline: A Technique of Combining IDS and IPS Together in Response Intrusion", First International Workshop on Education Technology and Computer Science, IEEE, Mar. 7-8, 2009, pp. 1118-1121.*

(Continued)

*Primary Examiner* — Victor Lesniewski
(74) *Attorney, Agent, or Firm* — Heslin Rothenberg Farley & Mesiti P.C.

(57) ABSTRACT

A method, computer program product, and system where a processor(s) in a distributed computing environment intercepts a communication (of sequential elements) between a first computing node and a second computing node. The processor(s) determines if the communication is undesired by evaluating data related to or comprising each element individually. The evaluating includes the processor(s) obtaining a first element (an earliest element in the sequence that has not been evaluated), determining, if the data related to or comprising the earliest element indicate that the communication is undesired, forwarding the earliest element to the second computing node, before obtaining a second element in the sequence (an element subsequent and adjacent to the earliest element in the sequence), and based on determining that the data related to or comprising the earliest element indicate that the communication is undesired, invalidating, an available element of the sequential elements such that the second computing node does not receive the communication in a usable format.

14 Claims, 7 Drawing Sheets

(56) References Cited

U.S. PATENT DOCUMENTS

| | | | |
|---|---|---|---|
| 10,284,575 B2* | 5/2019 | Paithane | G06F 21/6218 |
| 2004/0049596 A1* | 3/2004 | Schuehler | H04L 43/18 |
| | | | 709/238 |
| 2004/0151382 A1* | 8/2004 | Stellenberg | H04L 63/0263 |
| | | | 382/219 |
| 2005/0044406 A1* | 2/2005 | Stute | C12Q 1/6804 |
| | | | 726/4 |
| 2005/0076227 A1* | 4/2005 | Kang | H04L 63/1416 |
| | | | 713/188 |
| 2005/0076245 A1* | 4/2005 | Graham | G06F 21/552 |
| | | | 726/4 |
| 2005/0108573 A1* | 5/2005 | Bennett | H04L 63/0245 |
| | | | 726/4 |
| 2005/0120243 A1* | 6/2005 | Palmer, Jr. | H04L 63/1416 |
| | | | 726/4 |
| 2007/0006293 A1* | 1/2007 | Balakrishnan | H04L 63/0245 |
| | | | 726/13 |
| 2007/0011734 A1* | 1/2007 | Balakrishnan | H04L 43/026 |
| | | | 726/13 |
| 2007/0180526 A1* | 8/2007 | Copeland, III | H04L 63/1416 |
| | | | 726/23 |
| 2008/0075103 A1* | 3/2008 | Noble | H04L 41/069 |
| | | | 370/429 |
| 2008/0104703 A1* | 5/2008 | Rihn | G06F 21/56 |
| | | | 726/24 |
| 2008/0111716 A1* | 5/2008 | Artan | G06F 16/9014 |
| | | | 341/50 |
| 2008/0141332 A1* | 6/2008 | Treinen | H04L 63/1416 |
| | | | 726/1 |
| 2008/0189784 A1* | 8/2008 | Mangione-Smith | G06F 21/566 |
| | | | 726/23 |
| 2008/0295171 A1* | 11/2008 | Singh | H04L 63/1416 |
| | | | 726/23 |
| 2008/0301810 A1* | 12/2008 | Lehane | H04L 63/02 |
| | | | 726/23 |
| 2010/0115620 A1* | 5/2010 | Alme | G06F 21/563 |
| | | | 726/24 |
| 2011/0030057 A1* | 2/2011 | Chen | H04L 63/1416 |
| | | | 709/231 |
| 2013/0191917 A1* | 7/2013 | Warren | G06F 21/64 |
| | | | 726/23 |
| 2016/0105469 A1* | 4/2016 | Galloway | H04L 63/1441 |
| | | | 709/231 |
| 2016/0149934 A1* | 5/2016 | Frank | H04L 12/40032 |
| | | | 726/23 |
| 2016/0164886 A1* | 6/2016 | Thrash | H04L 63/14 |
| | | | 726/23 |
| 2017/0171362 A1* | 6/2017 | Bolotov | H04L 69/22 |
| 2018/0060267 A1* | 3/2018 | Sutton | H04L 12/40032 |

OTHER PUBLICATIONS

Weinsberg, Yaron; Tzur-David, Shimrit; Dolev, Danny; Anker, Tal; "High Performance String Matching Algorithm for a Network Intrusion Prevention System (NIPS)", Workshop on High Performance Switching and Routing, IEEE, Jun. 7-9, 2006, pp. 147-153.*

* cited by examiner

LOW DELAY NETWORK INTRUSION PREVENTION

STATEMENT REGARDING FEDERALLY SPONSORED RESEARCH OR DEVELOPMENT

This invention was made with Government support under contract FA8750-14-C-0248 awarded by the Air Force Research Laboratory. The Government has certain rights in the invention.

FIELD OF INVENTION

The invention relates preventative measures to mitigate intrusions in a computer network.

BACKGROUND OF INVENTION

A common approach to preventing network intrusions is to place a security device in-line in the network and to intercept and evaluate a whole packet received by the security device before making the decision whether to forward or drop the packet. This approach involves buffering whole packets. In networks that are delay constrained (and particularly networks that run at relatively slow link speeds), such as some networks in real time systems, the additional delay imposed by these steps (buffering and evaluation of a packet as a whole) may lead to incorrect system behavior.

SUMMARY OF INVENTION

Shortcomings of the prior art are also overcome and additional advantages are provided through the provision of a method for determining whether a communication is undesired, the method includes: intercepting, by one or more processors in a distributed computing environment, a communication between a first computing node and a second computing node, over a communications network, wherein the communication is comprised of sequential elements; determining, by the one or more processors, based on data related to or comprising the sequential elements, if the communication is undesired, wherein the determining comprises: evaluating, by the one or more processors, data related to or comprising each element individually, the evaluating comprising, for each element of the sequential elements of the communication: obtaining, by the one or more processors, a first element of the sequential elements of the communication, in sequence, wherein the first element is an earliest element in the sequence that has not been evaluated; determining, by the one or more processors, based on data related to or comprising the earliest element, if the data related to or comprising the earliest element indicate that the communication is undesired; forwarding, by the one or more processors, the earliest element to the second computing node over the communications network, before obtaining a second element in the sequence, wherein the second element is an element subsequent and adjacent to the earliest element in the sequence; and based on determining that the data related to or comprising the earliest element indicate that the communication is undesired, invalidating, by the one or more processors, an available element of the sequential elements, wherein the available element is an element of the sequential elements for which the forwarding is not complete, and wherein based on the invalidating, the second computing node does not receive the communication in a usable format.

Computer systems, computer program products, and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
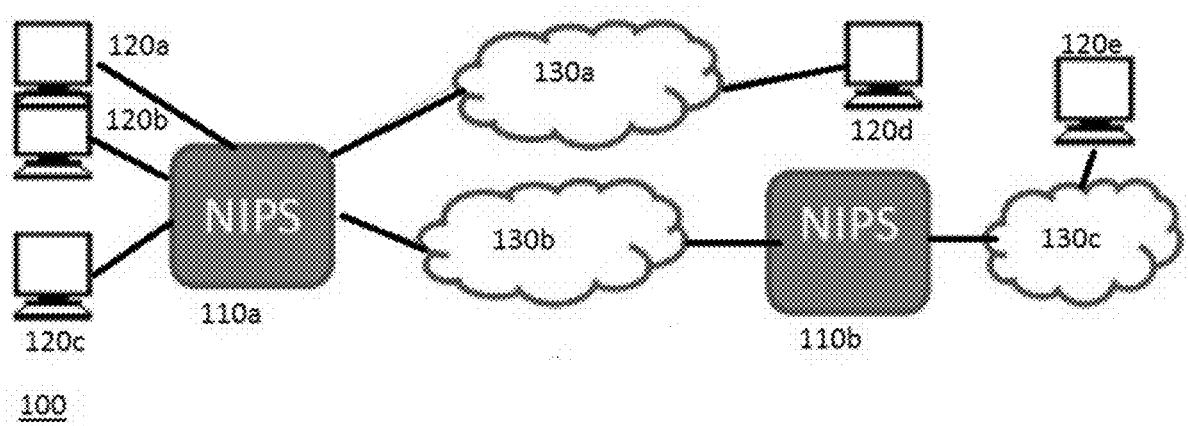
FIG. 1 depicts a technical environment into which aspects of embodiments of the present invention may be implemented.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. The terms software, program code, and one or more programs are used interchangeably throughout this application.

A network-based intrusion prevention system (NIPS) is a system used to monitor a network as well as to protect the confidentiality, integrity, and availability of a network. NIPS protect a network from threats, such as denial of service (DOS) attacks and unauthorized usage. In general, a NIPS monitors a given network for undesired activity, malicious activity, or suspicious traffic by analyzing the protocol activity. For ease of understanding, the term undesired is used throughout this application to refer to malicious or suspicious communications, but, also, to any communications that would be undesirable or problematic for any reason. To protect a network from these types of intrusions, a NIPS must quickly discern good traffic from bad traffic. However, existing NIPS utilize traffic evaluation methods that create unworkable delays in delay constrained networks. In general, inserting a device in a network adds delay and in a real time system and this additional delay may break the system, for example, by violating constraints regarding sending of a message and receiving of a response at any protocol level.

Embodiments of the present invention include a computer-implemented method, computer program product, and computer system that execute one or more programs (including hardware and/or software) that prevent intrusions into computer networks in delay constrained networks. For example, in certain embodiments of the present invention, the one or more programs provide this level of security with delays less than or equal to one bit of time. This gain in network performance is realized because, in existing intrusion detection devices and methods, delays occur when on network intrusion detection devices, which are placed in-line, receive a packet and make a decision about whether to forward or to drop the packet. In embodiments of the present invention, the one or more programs utilize an approach that eliminates one or more activities that comprise this decision process, thus, eliminating delays while maintaining communications integrity within a computing network. As will be discussed is great detail herein, one or more programs in embodiments of the present invention prevent intrusion into computer networks (and most effectively in delay constrained networks), by utilizing one or more of the following aspects: 1) the one or more programs eliminate the buffering delays in existing systems; 2) the one or more programs pipeline decisions regarding whether to drop or forward a data transmission (e.g., one or more packet); and 3) the one or more programs make decisions regarding the data transmitted in the network speculatively, and thus, the one or more programs apply decisions regarding whether to drop or transmit data sooner. Some embodiments of the present invention are referred to throughout as a NIPS and one or more programs in a NIPS.

A common technical architecture for combating network intrusion is illustrated in FIG. 1. In the computing network 100 of FIG. 1, security devices (e.g., NIPS) 110a-110b have been inserted into the network 100 at different in-line locations between components of the network to detect/block undesired communications. In FIG. 1, one security device 110a is in-line to evaluate transmissions between various computing nodes 120a-120c, and networks 130a-130b (each network can also be understood as a part of a network). A second security device 110b is in-line between two networks 130b-130c. The network 100 includes additional computing nodes 120d-120e. The network 100 in FIG. 1 is used for illustrative purposes and does not represent any constraints on the types and configurations of networks or network components that can benefit from the utilization of in-line security devices. As illustrated in FIG. 1, if computing node 120a (a sender) sends a message to computing node 120d (a receiver), security device 110a verifies the integrity of the transmission.

The technical environment 100 of FIG. 1 illustrates an approach to preventing network intrusions by placing security devices 110a-110b in-line in the network 100. In-line security devices 110a-110b are positioned to detect effectively and prevent attacks in real time, while remaining transparent to benign traffic. These security devices 110a-110b can be "bump-in-the-wire" two-port devices, such as security device 110b, which filter traffic that flows through them. The NIPS functionality can also be built into a switch or router, as illustrated by security device 110a. Another example of a NIPS device is a packet filter, where a switch, router, or firewall compares each received packet against a set of rules which lets the device know whether to accept or reject the packet. NIPS can comprise one or more of software and/or hardware.

Embodiments of the present invention provide improvements inextricably linked to computing by providing intrusion protection in networks with low tolerance for processing delays (i.e., a delay constrained environment). Embodiments of the present invention provide intrusion detection in environments with real-time communication constraints, including but not limited to, embedded, distributed systems that are: 1) old, such as legacy systems designed before security was a concern, diverse, such as environments that includes components that run different operating systems (OS), or no OS at all, and/or utilize different types of processors, and/or 2) limited, such as environments with slow processors, small memories, and/or a slow network. Systems into which aspects of embodiments of the present invention can be implemented include, but are not limited to, infrastructure systems (e.g., industrial control systems, including but not limited to, dams, generators, etc.), and systems integrated into transportation vehicles (e.g., ships, planes, and other vehicles with long lifetimes).

Even known improvements to existing network intrusion prevention methods are not operable in these delay constrained environments. As one example, even if delay is reduced at the decision stage, one or more programs receiving the packet into a buffer for examination minimally requires time equivalent to the length of the packet (e.g., for a 1000 bit packet on a 1 Mb/s network, the time to receive the packet is 1 ms). Even if the security device utilizes a shortcut called "cut-through" where the security device 110a-110b (FIG. 1) transmits a packet before receiving the full packet, the one or more programs must still buffer the packet to ascertain the entire address of the destination of the packet, and in some existing systems, one or more programs may buffer the packet and the one or more programs ascertain all of the fields or data, which are required to determine whether the packet violates or complies with a security processing rule. Thus, one or more program may delay data transmissions (packets) by many (specifically, as many as the number of bits prior to the end of the destination address) "bit-times." Packets are likewise delayed in existing devices when cut-through security devices buffer the entire packet because the bit which decides whether the packet may be transmitted or not is the last bit.

Thus, in contrast to existing methods, embodiments of the present invention provide improvements inextricably linked to computing by providing one or more programs that render a delay through a security device negligible (e.g., less than 1 bit time) such that the resultant security devices (hardware and/or software) can work in delay constrained networks, including but not limited to, providing a latency of less than 1 us on networks running at only 1 Mb/s where buffering a 64 byte packet takes 512 us. The one or more programs in embodiments of the present invention provide this improvement in the performance of a network, while maintaining security levels of existing NIPS, in part, by not buffering packets before making a drop/forward decision, pipelining decision making, and/or performing speculative decision making.

Figure 2:
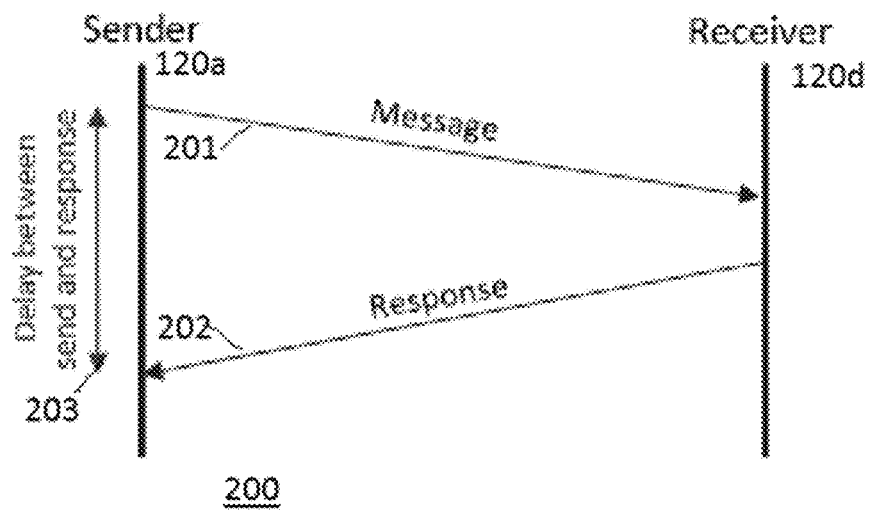
FIG. 2 depicts a certain aspects of communications on a network that does not utilize a security device between computing nodes.
Figure 3:
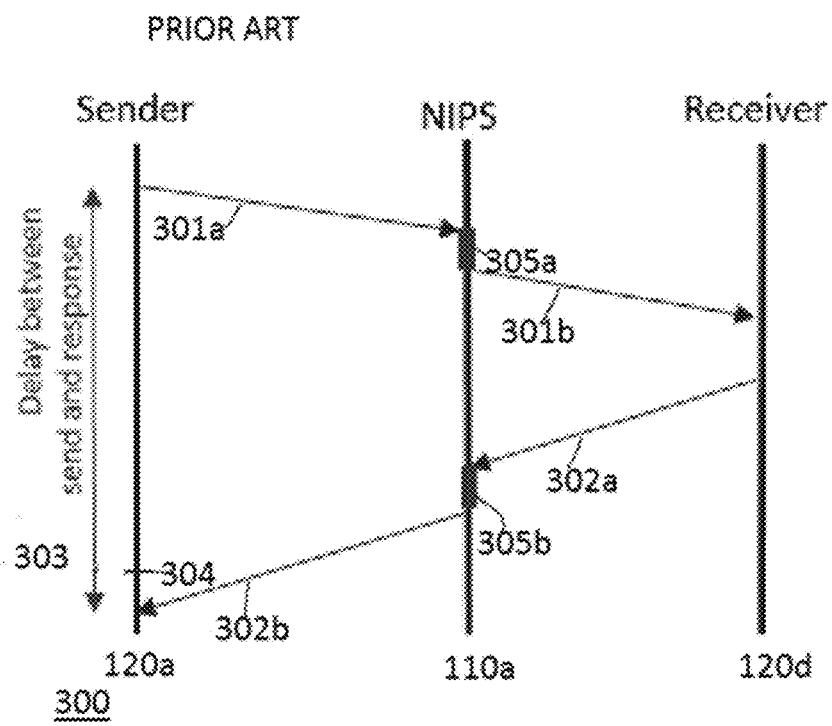
FIG. 3 depicts performance issues experienced when utilizing existing security devices in-line on a computing network.

Returning to FIG. 1, the security devices 110a-110b, filter out undesired traffic in the environment 100. However, existing methods utilized by these security devices 110a-110b can add unworkable delays to certain networks. FIGS. 2-3 illustrate delays imposed by the insertion of security devices 110a-110b employing existing network intrusion detection methods into networks. For illustrative purposes, FIGS. 2-3 depict characteristics of transmissions between computing nodes in FIG. 1, computing node 120a and computing node 120d, both with and without security device 110a processing the transmissions (in-line).

FIG. 2 illustrates a delay 203 between a sender 120a sending a message 201 to a receiver 120d and the sender 120a receiving a response 202 from the receiver 120d, when data is transmitted without the utilization of a security device 110a in-line (not pictured in FIG. 2).

In contrast to FIG. 2, FIG. 3 illustrates aspects of the utilization of a NIPS according to existing methods of intrusion detection in a network 300. FIG. 3 illustrates a delay 303 between a sender 120a sending a message 301a-301b to a receiver 120d and the sender 120a receiving a response 302a-302b from the receiver 120d, when a security device 110a is placed in-line, as also illustrated in FIG. 1, to prevent network intrusions. The delay 303 with a device 110a in-line is greater than the delay 203 (FIG. 2) without the device 110a. In FIG. 3, the overall delay 303 occurs because one or more programs in the security device 110a process the data transmitted between the computing nodes 120a, 120d. As illustrated in FIG. 3, there is a first delay 305a when the security device 110a intercepts a message 301a for intrusion detection and subsequently forwards the message 301b to the receiver 120d. There is a second delay 305b when the security device 110a intercepts a response 302a from the receiver 120d and inspects it before sending the response 302b to the sender 120a. As illustrated in FIG. 3, the additional delay caused by security processing is problematic because the response 302b reaches the sender 120a after an expected response time 304. Thus, the network 300 represented in FIG. 3 is delay constrained and the delay 303 is destructive to the functionality of the network 300.

The one or more programs in existing devices generally perform three to four steps when determining whether to forward a given transmission (e.g., a packet): 1) receiving and buffering a whole packet; 2) deciding whether to forward or drop the packet (i.e., determining whether the packet is undesired based on a variety of algorithms, heuristics, and/or rules); 3) forwarding or dropping the packet; and 4) generating an alert message if the packet is determined to be undesired. This process is referred to as a buffer-decide-forward process. Delays in networks utilizing these existing NIPS and methods, such as the delay 303 illustrated in FIG. 3, are primarily caused by one or more programs of an in-line security device buffering data (e.g., a packet before analyzing it), and analyzing the data transmission as a whole (e.g., a whole packet) to decide whether to forward or drop the transmission.

As illustrated in FIG. 3, which shows operation of a security device 110a in a delay constrained network 300, the additional delay imposed in a buffer-decide-forward process can be problematic. In FIG. 3, a protocol dictates that a message 301a-301b from a sender 120a times out if it does not receive a response 302a-302b from the receiver 120d in time, that time being the expected response time 304, $T_{MAX}$. In one example, in a network 300 all responses are received by the sender 120a in $T_{RESP}$, where $T_{RESP}$ is $<_{TMAX}$. If a security device 110a is inserted into the network 300 and the device adds a delay between sender 120a and receiver 120d of greater than $(T_{MAX}-T_{RESP})$, then the sender will timeout on all messages it sends, causing the system to behave incorrectly.

Figure 4:
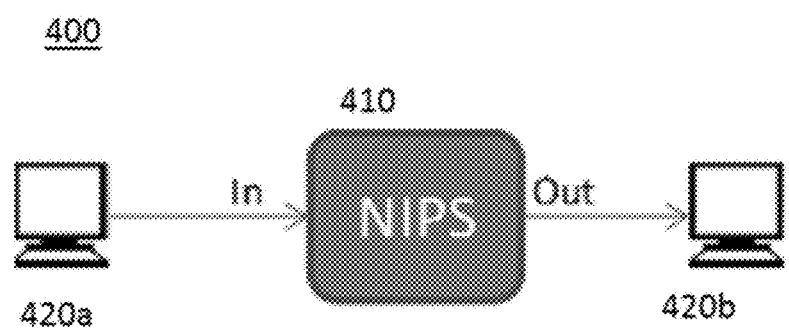
FIG. 4 depicts a technical environment into which aspects of embodiments of the present invention may be implemented.

FIG. 4 is a technical environment 400 that includes a computing node that is a sender 420a and a computing node that is a receiver 420b. In-line, intercepting communications between the sender 420a and the receiver 420b, is a NIPS 410, a security device. As illustrated in FIG. 4, all communications from sender 420a to receiver 420b, originate from the sender 420a, go into the NIPS 410, where one or more programs vet the communication and decide whether to forward it, and, in some cases, forward the communication out of the NIPS 410 to the receiver 420b. This technical environment is referenced for illustrative purposes in FIGS. 5-6, which contrast the delay in examining data transmitted over a network using existing intrusion detection methods and those utilizing aspects of an embodiment of the present invention. Examples herein reference single node to single node communications for the sake of simplicity. However, as understood by one of skill in the art, the aspects of the embodiments of the present invention described herein can be utilized to evaluate broadcast messages and other communications with more than one destination.

Figure 5:
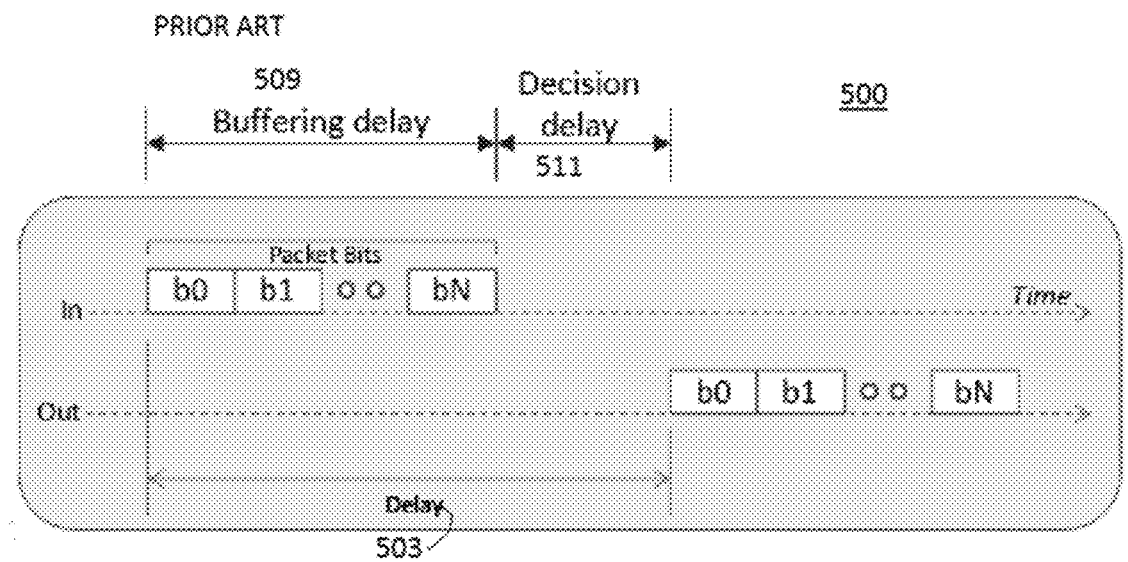
FIG. 5 illustrates aspects of existing methods of intrusion detection on a computing network.
Figure 6:
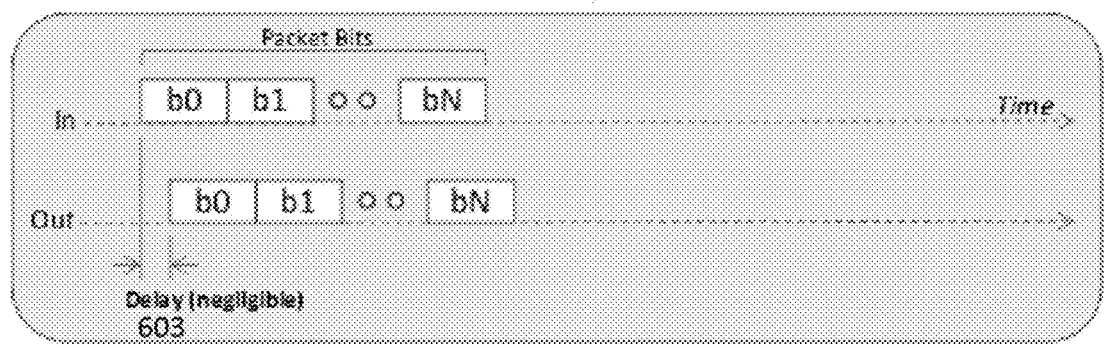
FIG. 6 illustrates aspects of embodiments of the present invention when utilized for intrusion detection on a computing network.

Although FIGS. 5-6 utilize bits as examples of elements of a data transmission (e.g., a packet) that are examined for integrity by one or more programs in both illustrated methods, a bit is merely one example of an element of a data transmission that can be examined in embodiments of the present invention. The bit is utilized herein, in order to illustrate differences between existing methods and aspects of embodiments of the present invention, in an easily understandable format. In various embodiments of the present invention, elements include individual bits, a number (e.g., pre-defined, integral) of bits, and/or fractional bits. In embodiments of the present invention, a measure of data comprising an element may vary depending upon encoding in the transmissions.

FIG. 5 illustrates an existing method of determining whether a transmission from a sender 420a in a network 400 should be forwarded to the intended receiver 420b, in the network. As depicted in FIG. 5, upon receiving a packet of bits (b0-bN) from a sender 420a, one or more programs in a NIPS 410 buffer the packet before analyzing any individual bits. After the buffering is complete, the one or more programs perform an analysis to determine whether to forward or to drop the packet. The results of the buffering wait time and the analysis time is a delay 503. Thus, the delay 503 (i.e., an input-to-output packet forwarding delay) consists of a delay due to the one or more programs buffering 509 the packet and a delay due to the one or more programs making a decision 511 regarding whether to forward or drop the packet.

FIG. 6 illustrates a negligible delay 603 (i.e., an input-to-output packet forwarding delay) achieved by one or more programs in the NIPS 410 in accordance with aspects of embodiments of the present invention. FIG. 6 also illustrates one or more programs determining whether a transmission from a sender 420a in a network 400 should be forwarded to the intended receiver 420b in the network. As illustrated in FIG. 6, in embodiments of the present invention, one or more programs of a NIPS 410 do not buffer in order to receive the entirety of a communication, in this example, a packet. Rather, the one or more programs operate on a communication by evaluating a given number of elements of the communication at a single time. In FIG. 6, the one or more programs evaluate each bit (e.g., element) of a packet (e.g., communication, transmission), separately and one at a time. Thus, the one or more programs executing on at least one processing circuit, evaluate b0, then b1, etc. In other embodiments of the present invention, the one or more programs evaluate elements individually, but skip certain elements, rather than evaluate the elements in sequence, as illustrated in FIG. 6.

By foregoing buffering an entirety of a communication before making a decision regarding whether to forward or drop the communication, the one or more programs determine whether to forward or drop some or all of the communication before viewing or analyzing the communication as a whole. In an embodiment of the present invention, the one or more programs determine whether to drop or forward a packet based on an address in the packet header. Thus, once the one or more programs receive this data, the one or more programs determine whether to enable the remainder of the packet to pass through the NIPS 410, or whether to drop the packet. Because the one or more programs evaluate the communication progressively, the one or more programs may determine that a communication should be dropped after already outputting a portion of the communication from the NIPS 410 to the receiver 420b. The one or more programs will output portions of the packet until the one or more programs received data that would enable the one or more programs to make a decision to drop the communication. However, despite having forwarded a portion of the communication, the one or more programs may take a subsequent action to render the communication harmless, including but not limited to, truncating the communication and/or invalidating the communication through another means, including forcing bad parity or a bad checksum.

In embodiments of the present invention, once the one or more programs evaluate an element and conclude, based on data gleaned in analysis of elements to that point, that the communication is undesired, the one or more programs may not proceed in evaluating the remainder of the communication. The one or more programs limit any analysis delay through the ability to make a decision regarding a communication without buffering and/or evaluating the entirety of the communication at any time.

Figure 7:
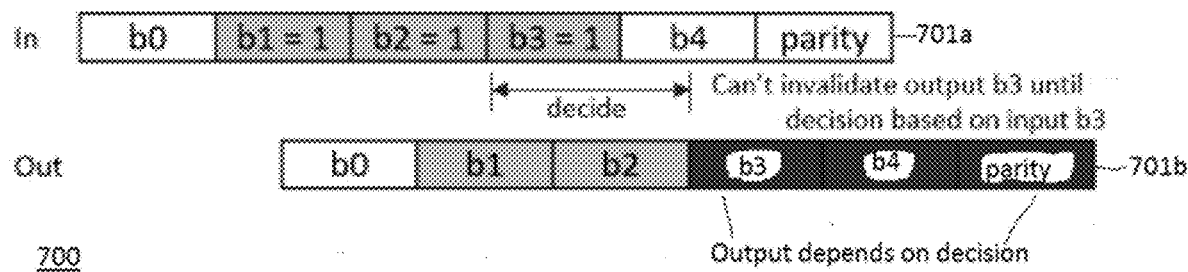
FIG. 7 illustrates certain aspects of embodiments of the present invention.

FIG. 7 provides an illustration of how incrementally evaluating a communication in accordance with aspects of the present invention positively impacts the efficiency of the intrusion detection. A packet of bits is used as an example of a communication for illustrative purposes, only. In FIG. 7, a sender 420a is transmitting a receiver 420b a 6 bit packet comprised of 5 data bits, b0-b4, and 1 bit is a parity bit. To reach receiver 420b, one or more programs in a NIPS 410 evaluate the packet to determine if it is undesired. As illustrated in FIG. 7, the delays are 1 us bit time and 1.5 us decision time. The one or more programs of the NIPS 410 operate a rule that the packet should be dropped if {b1,b2,b3}=111. In FIG. 7, b1, b2, and b3 are "111." Thus, the one or more programs will ultimately invalidate the communication. In embodiments of the present invention, the one or more programs evaluate the bits progressively, so b0, b1, b2 are all output before the one or more programs can apply this rule to decide whether to forward or drop the packet. However, once the one or more programs gain access to b3, the one or more programs determine that the packet should not be forwarded and can therefore invalidate the remainder of the packet, rendering the communication harmless. The one or more programs do not implement any delay into the process until the one or more programs receive b3 and apply the rule. The rule utilized herein in merely one example of a type of one or more rules that can be utilized by the one or more programs in embodiments of the present invention to determine if traffic being evaluated is potentially detrimental. Rules utilized in embodiments of the present invention may be predefined as well as evaluable. Certain embodiments of the present invention apply probabilistic rules and/or learned behavior to make the determination of whether certain communications are undesired.

In some embodiments of the present invention, the one or more programs of the NIPS 410 may also achieve the negligible delay 603 by pipelining decisions whether to drop or forward a communication. In embodiments of the present invention, the one or more programs determine whether to drop or forward a communication from a sender 420a to a receiver 420b by determining whether a given communication (e.g., packet, transmission) is undesired. In making this determination, the one or more programs may utilize one or more algorithms, heuristics, and/or rules. In embodiments of the present invention the one or more programs implement a decision on a given element of a communication (e.g., a bit of a packet) at a given interval after determining whether to forward and/or drop the element. For example, in an embodiment of the present invention, the one or more programs examine an element (e.g., a bit, b0) and determine that this element should be forwarded to the receiver 420b. Thus, even though it may take the one or more programs an element time (e.g., a whole bit time) to make a decision regarding whether to forward or drop the element, the delay introduced by the one or more programs of the NIPS 410 can still be much less than an element time (e.g., a bit time). Because the one or more programs will apply a decision later, the one or more programs enable the device 410 to output the element immediately after receiving it, without waiting for a decision, since the decision the one or more programs make will apply later. In embodiments of the present invention, the one or more programs can forward an element (e.g., one or more bits) at a given time whether or not the one or more programs have completed evaluating the element. Thus, the analysis of an element and the forwarding of that element are not inter-dependent.

Figure 8:
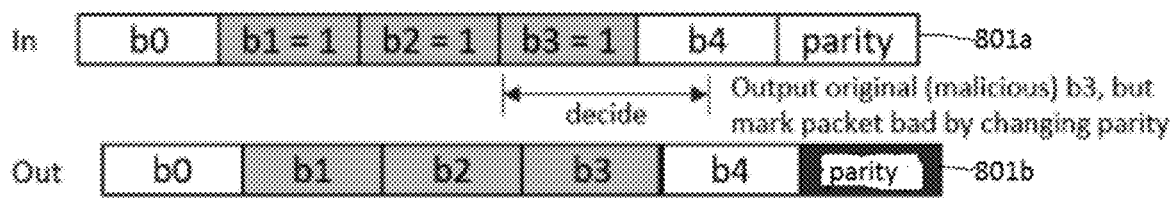
FIG. 8 illustrates certain aspects of embodiments of the present invention.

FIG. 8 illustrates how the one or more programs of a NIPS 410 in an embodiment of the present invention pipeline a communication between a sender 420a and a receiver 420b, in accordance with one or more aspects of an embodiment of the present invention. FIG. 8 utilizes the same communication, elements, and rule as FIG. 7. Thus, the one or more programs will determine that the packet should be dropped if {b1,b2,b3}=111. In FIG. 8, because the one or more programs do not implement decisions on elements immediately after evaluating those elements, the one or more programs may output undesired elements, but subsequently prevent these undesired elements from reaching the intended destination (e.g., receiver 420b). As illustrated in FIG. 8, the one or more programs determine that the communication should not be forwarded after having already output the element that provoked this decision. The one or more programs determined that the packet was undesired after having received b3 and recognizing its value as "1." However, at this time, the one or more programs has already output this bit, b3. Thus, in order to render the communication harmless, the one or more programs implement a change at the later time (determined by the pipelining) to an unrelated portion of the communication, to the same effect. In this example, the one or more programs, having already output b3, mark the packet bad by changing the parity bit, rendering the undesired communication harmless.

Although certain embodiments of the present invention may utilize pipelining to gain efficiency, in certain embodiments and in certain situations, the one or more programs take an opposite approach. In some embodiments of the present invention, the one or more programs on the NIPS 410 determine whether to forward or drop communications between components of a network (e.g., sender 420a and receiver 420b) speculatively, in order to apply decisions sooner. In some situations, in certain embodiments of the present invention, delaying the application of a decision or pipelining, as described above, may be undesirable. When one or more programs pipeline decisions, as described above, the value received for element i (e.g., bit i) can affect the value that the one or more programs output for element i+1. In some situations, though, transmitting element i and invalidating the transmission at a later element, is not desirable (e.g., if element i is the last element or contains information that must not be transmitted). Instead, the one or more programs make a decision regarding bit i that affects the output of i. To this end, in some embodiments of the present invention, when examining element i−1, the one or more programs pre-compute both the value to output for the next element (element i) if element i is 0 and the value to output if element i is 1. Then, when element i arrives, because the one or more programs have anticipated the possible values value element i, the one or more programs can very quickly generate an output based on the speculative computation performed during the time that the one or more programs received the previous element time (e.g., the previous bit time).

Figure 9:
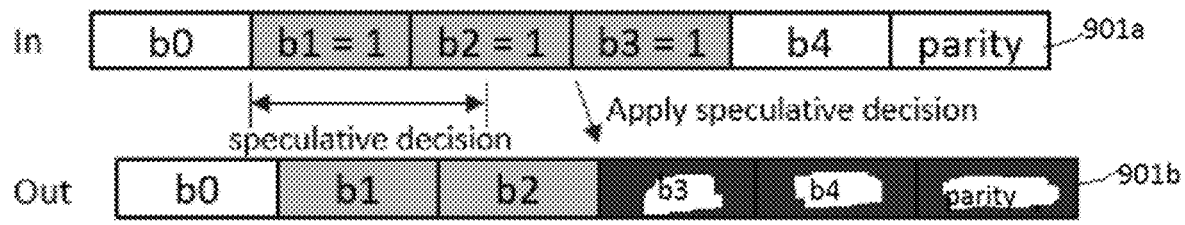
FIG. 9 illustrates certain aspects of embodiments of the present invention.

FIG. 9 illustrates the speculative decision-making aspect of certain embodiments of the present invention. As depicted in FIG. 9, one or more programs applies speculative decision-making to evaluate the output value of element b3 from the NIPS 410, for all permutations of {b2,b3}. Based on anticipating the value of b3, the one or more programs can apply a decision to b3 immediately. In FIG. 9, the one or more programs determine that the packet should be dropped if {b1,b2,b3}=111. Thus, when the one or more programs receive b1 and b2, the one or more programs speculate regarding the value of b3. Thus, when b3 is received and is "1", the one or more programs apply the handling when {b1,b2,b3}=111, and output b3 itself as invalid. This speculative decision-making enables the one or more programs to apply a decision to b3 immediately upon its arrival at the NIPS 410.

In certain embodiments of the present invention, performing security processing of an element of a communication (e.g., between 420a and 420b) has high latency (e.g., if the element must be transferred to a different processor or core) such that the full decision making latency may be greater than one element, the one or more programs in the NIPS may speculatively predict decisions several elements in advance. In order to make a decision for more than one element in advance, the one or more programs may utilize more storage (e.g., $2^n$ for each speculative decision if considering bits, or $k^n$ if considering alternate elements).

In embodiments of the present invention, the one or more programs may enact speculative decision making in a stateful/multi-phase manner, or based on higher level concepts. Regarding the latter, if the element is a bit, the decision making may be based on a higher level concept than these individual bits. For example, if the one or more programs evaluates each bit, if a particular 8 bit integer field with a two's compliment encoding and big-endian bit ordering must have a value of 4 or lower, if the first 7 bits of the integer transmitted indicate that the value may either be a 4 or 5, then the speculative decision would be that a zero bit (indicating 4) should be allowed while a one bit (indicating 5) should not be allowed. As an example of a stateful/multi-phase speculative decision, if the security rule were that the sum of several 8 bit integers in a single, or multiple (cumulative) packets must be less than 577, as the one or more programs add up, if the possible total including the next 8-bit value might be greater than the max, a limit on the next value might be placed to, 577-current_total. The one or more programs would generate a speculative rule would be placed on the entire field that would translate into specific speculative bit/element decisions. Another example includes specific constraints of higher level protocols, such as the layout of a TCP/IP header and/or application data that is enforced by the one or more programs, such as a requested DNS name.

In some embodiments of the present invention, the one or more programs generate speculated contents for elements that have yet to be evaluated. From the speculated data related to or comprising elements, the one or more programs can determine if the communication is undesired. The one or more programs store or preload each (or groups of, or informative data about) the speculative content with information about whether the speculative content is undesired. The one or more programs later reference this data in decision-making regarding communications.

In various embodiments of the present invention, the implementation of the security processing and speculative decision-making may vary. For example, the security processing may be encoded in several different ways. In some embodiments of the present invention, the one or more programs utilize a state machine that enumerates the complete set of states representing all possible received events (e.g., any packet, any message, any error, or other state). With these states, the one or more programs can efficiently process and implement speculative decisions. Specifically, the one or more programs can examine all possible outbound edges from the current state, and load those edges into the low-latency real-time processing system. Because this encoding can be very verbose and for non-trivial systems, utilizing this type of processing, the one or more programs could quickly exceed the storage capacity of the technical environment because these state machines can grow large and be difficult to construct. Thus, the one or more programs can utilize various methods of encoding that enable the one or more programs to also reduce storage. For example, the one or more programs may prune all states after making a decision to drop a communication (e.g., packet) or to collapse isomorphic states. To reduce the capacity requirements, in some embodiments of the present invention, the one or more programs can utilize a critical-element (e.g., critical-bit) state machine with look-back. Specific elements or bits in the processing of a communication or packet may be critical, for example, an element or bit is critical if it indicates the end of a 8 bit integer field which must be checked to see if the value is <=4. In some embodiments of the present invention, the one or more programs may indicate a critical portion (e.g., a bit ending the field is critical) and when it is processing the element immediately prior to the critical portion (or several elements prior to the critical element if the processing latency is high), the one or more programs look back at the history of bits and then decide what will happen if the next bit is a zero or a one, and load those decisions into the speculative entries in the real-time processing system.

Returning to FIG. 4, the one or more programs that operate in the NIPS 410 and the elements of the NIPS 410 itself, in various embodiments of the present invention, may be implemented using a variety of architectural elements. For example, the NIPS 410 may be implemented utilizing a generic computer system. Alternatively, embodiments of the present invention may include specialized components to perform the described real time signal processing and/or the higher level security policy processing, as the one or more programs may determine the policy after the system that enforces the policy has been instantiated.

In some embodiments of the present invention, the speculative processing of FIG. 9 may be accelerated using parallel execution to explore and encode the state space of potential received bits. Additionally, this processing may be accelerated in certain embodiments of the present invention by encoding/compiling security rules by batch size to specifically spell out the set of allowed or denied states, reducing the amount of processing required during speculative decision making.

In some embodiments of the present invention, the one or more programs include a real time component, to receive signals as decoded from a physical layer interface that translates voltages and waveforms of the incoming signals into ones and zeros. The real time component processes the incoming signals, evaluates the received element (including for speculative decisions), and then transmits the element on the line or lines that receive the element. In some embodiments of the present invention, the one or more programs identify the proper line or lines for transmission based on a security policy. This security policy may change from bit to bit, or packet to packet, or message or message.

In some embodiments of the present invention, a real time component may run on a general purpose computer, may run on one or more special purpose computers in a pipeline manner (e.g., supported with network-processors), and/or may run in an field-programmable gate array (FPGA) or in an application-specific integrated circuit (ASIC). In embodiments of the present invention that handle the real time processing in an ASIC or FPGA, the one or more programs that handle security processing may run in a more capable environment, such as a general purpose CPU, in order to evaluate the full set of high level dynamically loaded security policies. If the set of security policies is such that they can be evaluated on an ASIC or FPGA, the device may perform full-pipelined security evaluation. If the set of security policies is evaluated on a general purpose CPU, the process of transferring an element from the real time system to the general purpose CPU may have enough latency to require the use of speculative decision making. One or more programs in embodiments of the present invention that comprise the NIPS 410 may perform several layers of parallel or pipelined security policy decisions using more and more capable CPUs where the bit, packet, full message, or entire historical state of all messages may be required to make a decision as to whether a received element (e.g., bit or bits) indicates good or bad behavior. The one or more programs may determine the veracity of an element speculatively, such that each engine can speculatively specify whether the next element being zero or one would indicate forward or drop. To simplify the real time processing system, in some embodiments of the present invention, if multiple components indicate different behavior, bit-wise 'OR' (if 1 means drop) or bit-wise 'AND' (if 0 means drop) can be used to create a unified speculative decision from the information provided by each component.

Embodiments of the present invention may utilize non-straightforward bit encoding schemes to increase bandwidth. The use of these schemes are enabled in embodiments of the present invention that utilize newer physical data transmission standards, such as IEEE 802.3an (for 10GBASE-T). In one non-limiting example, when over 12 data bits are encoded per symbol sent over the wire, the one or more programs would not operate efficiently by processing data a bit at a time. Instead, the one or more programs process the input stream a symbol at a time, where each symbol encodes a batch of bits.

Aspects of various embodiments of the present invention can be implemented in networks with high speed data transmission standards (e.g., 10GBASE-T) such that the data rates are high enough that a propagation delay through a cable overwhelms the delay of receiving a single bit or single symbol. In this situation, the time to receive a symbol is approximately equal to the propagation delay through 0.26 meters (or slightly over 10 inches) of a typical Cat 6e cable. As such, without adding noticeable delay, the one or more programs may batch several symbols together to reduce processing overhead and to reduce the cost of the hardware required to implement the low delay NIPS 410. The characteristics of a specific embodiments of the present invention may be dictated in part by the application. In some applications, whether two machines are 3 feet apart or 6 feet apart is indistinguishable, so adding a few more nanoseconds of delay to process multiple symbols at the same time is likewise indistinguishable. In other applications, such as scientific or financial ones, adding an additional nanosecond delay may not be acceptable.

As discussed earlier, in some embodiments of the present invention, the elements processed individually by the one or more programs in the NIPS 410 are multiple bits, and the one or more programs process these multiple bits all at one time. The one or more programs apply a speculative decision encoding algorithm and process adapted to handle these multiple bits. In some embodiments of the present invention, instead of loading an outcome of a test of whether the next bit is a zero or a one (e.g., if the one or more programs allow a bit to proceed, if the bit is a one, interrupt transmission), the one or more programs load the outcome of the test for the next group of bits. Processing the multiple bits in this manner may take longer than single bit processing, for example, 8 bits of speculative decisions requires $2^8$ (or 256) table entries.

Embodiments of the present invention include a computer-implemented method, a computer programs product, and a computer system that include one or more programs executing on one or more resources of a distributed computing environment intercepting a communication between a first computing node and a second computing node, over a communications network, where the communication includes sequential elements. The one or more programs determine, based on data related to or comprising the sequential elements, if the communication is undesired by evaluating data related to or comprising each element individually. To evaluate each element, the one or more programs obtain a first element of the sequential elements of the communication, in sequence, where the first element is an earliest element in the sequence that has not been evaluated. The one or more programs determine, based on data related to or comprising the earliest element, if the data related to or comprising the earliest element indicate that the communication is undesired. The one or more programs forward the earliest element to the second computing node over the communications network, before obtaining a second element in the sequence, where the second element is an element subsequent and adjacent to the earliest element in the sequence. Based on determining that the data related to or comprising the earliest element indicate that the communication is undesired, the one or more programs invalidate an available element of the sequential elements, where the available element is an element of the sequential elements for which the forwarding is not complete, and where based on the invalidating, the second computing node does not receive the communication in a usable format.

In some embodiments of the present invention, the data related to or comprising each element of the sequential elements includes the contents and/or the state information. The data related to or comprising the earliest element may indicate that the communication is undesired based on a combination of data in the earliest element and data in at least one preceding element in the sequence.

In some embodiments of the present invention, the one or more programs may stop evaluating the communication when an event occurs. This event is either the one or more programs determining that the data related to or comprising the earliest element indicate that the communication is undesired or the one or more programs forwarding a final element in the sequence of the sequential elements.

In some embodiments of the present invention, the available element is either the earliest element or an element subsequent to the earliest element in the sequence.

In some embodiments of the present invention, the one or more programs forward and invalidate occur during overlapping time intervals. In other embodiments of the present invention the one or more programs forward based on determining that the data related to or comprising the earliest element do not indicate that the communication is undesired.

In some embodiments of the present invention, for each element, when the one or more program forwards that element, the one or more programs retain a value of the forwarded element. For each element, when the one or more programs determine, based on data related to or comprising the earliest element, if the data related to or comprising the earliest element indicate that the communication is undesired, the one or more programs identify a rule for determining if the communication is undesired, where the rule defines an order of element values indicating an undesired communication. The one or more programs identify a value of the earliest element and determine, based on the retained value of at least one forwarded element, if the value of the earliest element comprises a final value of the order of element values indicating an undesired communication. This rule may be either pre-defined or evaluable.

In some embodiments of the present invention, when the one or more programs evaluate the data related to or comprising each element individually, the one or more programs speculate, based on the data related to or comprising the earliest element, data related to or comprising at least one subsequent element in the sequence to determine speculated data related to or comprising the at least one subsequent element, where the at least one subsequent element comprises speculated data related to or comprising the second element. The one or more programs store the speculated data related to or comprising the at least one subsequent element with data indicating whether the speculated data related to or comprising the at least one subsequent element indicate that the communication is undesired. Then, the one or more programs evaluate the speculated data related to or comprising the element in making determinations.

The sequential elements in some embodiments of the present invention are bits and the communication is a data packet. In other embodiments, the elements are each a number (pre-defined, calculated, etc.) of bits (or partial bits) and the communication comprises a data packet.

In some embodiments of the present invention, a time interval between the one or more programs obtaining and forwarding an element is a delay, which is less than or equal to one bit time.

Figure 10:
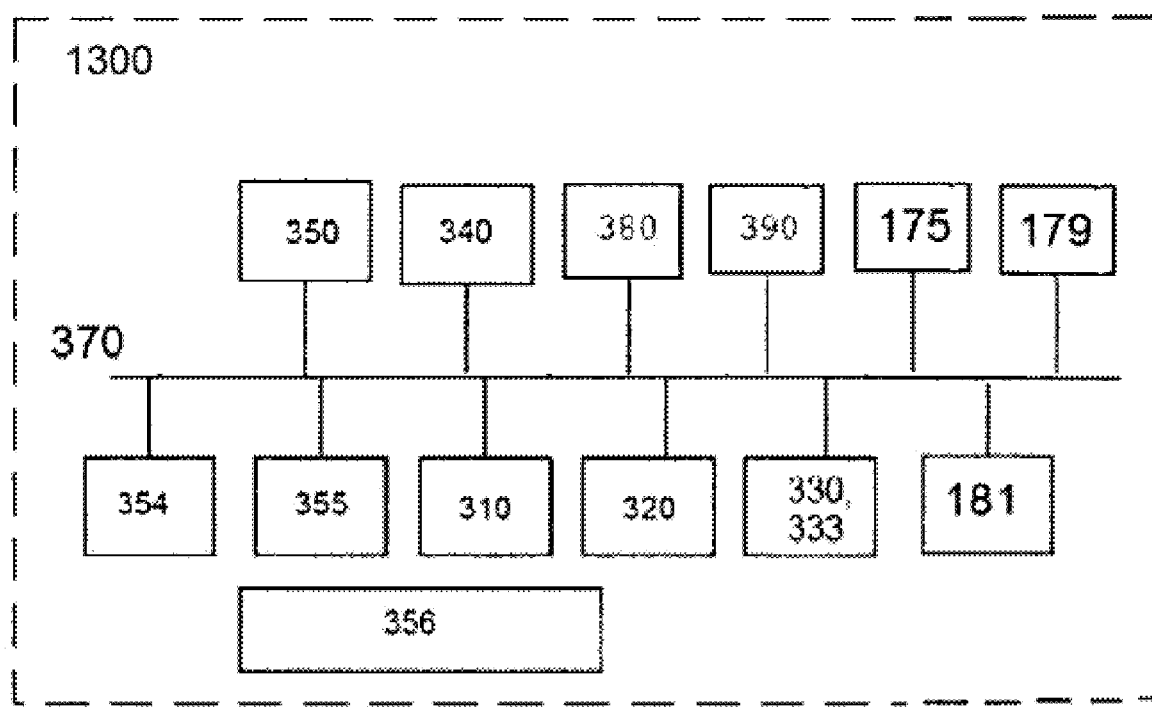
FIG. 10 depicts one embodiment of a single processor computing environment, which may comprise a node of a cloud computing environment, to incorporate and use one or more aspects of the present invention.

FIG. 10 illustrates a block diagram of a resource 1300 in computer system 100 and/or terminal 120a-120b, which is part of the technical architecture of certain embodiments of the technique. The resource 1300 may include a circuitry 370 that may in certain embodiments include a microprocessor 354. The computer system 1300 may also include a memory 355 (e.g., a volatile memory device), and storage 181. The storage 181 may include a non-volatile memory device (e.g., EPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1300 may include a program logic 330 including code 333 that may be loaded into the memory 355 and executed by the microprocessor 356 or circuitry 370.

In certain embodiments, the program logic 330 including code 333 may be stored in the storage 181, or memory 355. In certain other embodiments, the program logic 333 may be implemented in the circuitry 370. Therefore, while FIG. 2 shows the program logic 333 separately from the other elements, the program logic 333 may be implemented in the memory 355 and/or the circuitry 370.

Using the processing resources of a resource 1300 to execute software, computer-readable code or instructions, does not limit where this code can be stored.

Figure 11:
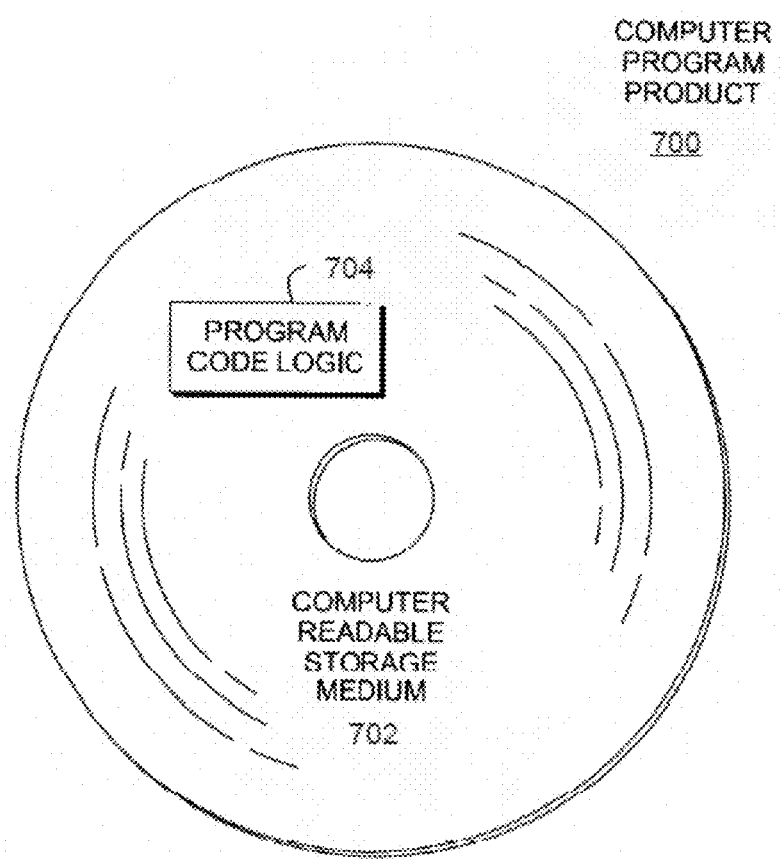
FIG. 11 depicts one embodiment of a computer program product incorporating one or more aspects of the present invention.

Referring to FIG. 11, in one example, a computer program product 700 includes, for instance, one or more non-transitory computer readable storage media 702 to store computer readable program code means or logic 704 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, Java, Python, R-Language, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer (workstation).

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Embodiments of the present invention may be implemented in cloud computing systems. FIG. 10 may also comprise a node in this type of computing environment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   intercepting, by one or more processors in a distributed delay constrained computing environment, in-line without an intermediary device, to perform intrusion detection, a communication between a first computing node and a second computing node, over a communications network of the delay constrained computing environment, wherein communications within the delay constrained computing environment are limited by a constraint to delays of one bit, wherein the communication is comprised of sequential elements, wherein the communication comprises a data packet, and wherein the sequential elements each comprise a pre-defined number of bits, and wherein the pre-defined number is less than a number of bits comprising the packet;
   determining, by the one or more processors, based on data related to or comprising the sequential elements, if the communication is undesired, wherein the determining comprises:
      evaluating, by the one or more processors, individually and separately, for integrity, prior to an occurrence of an event, data related to or comprising each element, wherein the communication is evaluated incrementally and separately element by element, wherein the evaluating of the communication comprises a delay of less than or equal to one bit, to comport with the constraint, the evaluating comprising, for each element of the sequential elements of the communication:
         determining, by the one or more processors, that latency for evaluating the communication could exceed the constraint;
         obtaining, by the one or more processors, only a first element of the sequential elements of the communication, in sequence, wherein the first element is an earliest element in the sequence that has not been evaluated;
         determining, by the one or more processors, based on data related to or comprising the earliest element, that the data related to or comprising the earliest element indicate that the communication is desired;
         based on determining that the data related to or comprising the earliest element indicate that the communication is desired, forwarding the first element to the second computing node;
         speculating, by the one or more processors, based on a value of the first element of the communication, before obtaining a second element of the communication, possible values for the second element of the communication wherein the second element is an element subsequent and adjacent to the earliest element in the sequence, wherein one or more values of the possible values indicate that data related to or comprising the second element indicate that the communication is desired and one or more additional values of the possible values indicate that the communication is undesired, and wherein the one or more values and the one or more additional values together comprise all the possible values;
         determining, by the one or more processors, based on the speculating, an action for handling the communication based on each value of the possible values, wherein the action is selected from the group consisting of: outputting the second element of the communication to the second computing node, and invalidating and outputting an invalidated second elements of the communication to the second computing node;
         obtaining, by the one or more processors, the second element in the sequence, wherein obtaining comprises identifying a value of the second element from the possible values and contemporaneously with the obtaining, initiating the action based on the value; and determining, by the one or more processors, the event has occurred; and based on the occurrence of the event, stopping, by the one or more processors, the evaluating of the communication, wherein the event is selected from the group consisting of: the invalidating of the second element and forwarding a final element in the sequence of the sequential elements comprising the communication to the second computing node.

2. The computer-implemented method of claim 1, where the data related to or comprising each element of the sequential elements is selected from the group consisting of: contents and state information.

3. The computer-implemented method of claim 1, wherein the data related to or comprising the earliest element indicate that the communication is desired based on a combination of data in the earliest element and data in at least one preceding element in the sequence.

4. The computer-implemented method of claim 1, wherein, for each element of the communication, the forwarding each element further comprises retaining a value of the forwarded element, and wherein, for each element, the determining, based on data related to or comprising the earliest element, if the data related to or comprising the earliest element indicate that the communication is undesired, further comprises:

identifying, by the one or more processors, a rule for determining if the communication is undesired, wherein the rule defines an order of element values indicating an undesired communication;

identifying, by the one or more processors, a value of the earliest element; and determining, by the one or more processors, based on the retained value of at least one forwarded element, if the value of the earliest element comprises a final value of the order of element values indicating an undesired communication.

5. The computer-implemented method of claim 4, wherein the rule is pre-defined or evaluable.

6. The computer-implemented method of claim 1, wherein the sequential elements each comprise bits and the communication comprises a data packet.

7. The computer-implemented method of claim 1, wherein invalidating the second element comprises an action selected from the group consisting of: truncating the communication, forcing bad parity, and forcing a bad checksum.

8. The computer-implemented method of claim 1, wherein receiving the first element at the second computing node is contemporaneous with initiating the action based on the value.

9. A computer program product comprising:

a non-transitory computer readable storage medium readable by one or more processors in a distributed delay constrained computing environment, and storing instructions for execution by the one or more processors for performing a method comprising:

intercepting, by the one or more processors in the distributed delay constrained computing environment, in-line without an intermediary device, to perform intrusion detection, a communication between a first computing node and a second computing node, over a communications network of the delay constrained computing environment, wherein communications within the delay constrained computing environment are limited by a constraint to delays of one bit, wherein the communication is comprised of sequential elements, wherein the communication comprises a data packet, and wherein the sequential elements each comprise a pre-defined number of bits, and wherein the pre-defined number is less than a number of bits comprising the packet;

determining, by the one or more processors, based on data related to or comprising the sequential elements, if the communication is undesired, wherein the determining comprises:

evaluating, by the one or more processors, individually and separately, for integrity, prior to an occurrence of an event, data related to or comprising each element, wherein the communication is evaluated incrementally and separately element by element, wherein the evaluating of the communication comprises a delay of less than or equal to one bit, to comport with the constraint, the evaluating comprising, for each element of the sequential elements of the communication:

determining, by the one or more processors, that latency for evaluating the communication could exceed the constraint;

obtaining, by the one or more processors, only a first element of the sequential elements of the communication, in sequence, wherein the first element is an earliest element in the sequence that has not been evaluated;

determining, by the one or more processors, based on data related to or comprising the earliest element, that the data related to or comprising the earliest element indicate that the communication is desired;

based on determining that the data related to or comprising the earliest element indicate that the communication is desired, forwarding the first element to the second computing node;

speculating, by the one or more processors, based on a value of the first element of the communication, before obtaining a second element of the communication, possible values for the second element of the communication wherein the second element is an element subsequent and adjacent to the earliest element in the sequence, wherein one or more values of the possible values indicate that data related to or comprising the second element indicate that the communication is desired and one or more additional values of the possible values indicate that the communication is undesired, and wherein the one or more values and the one or more additional values together comprise all the possible values;

determining, by the one or more processors, based on the speculating, an action for handling the communication based on each value of the possible values, wherein the action is selected from the group consisting of: outputting the second element of the communication to the second computing node, and invalidating and outputting an invalidated second elements of the communication to the second computing node;

obtaining, by the one or more processors, the second element in the sequence, wherein the obtaining comprises identifying a value of the second element from the possible values and contemporaneously with the obtaining, initiating the action based on the value; and determining, by the one or more processors, the event has occurred; and based on the occurrence of the event, stopping, by the one or more processors, the evaluating of the communication, wherein the event is selected from the group consisting of: the invalidating of the second element and forwarding a final element in the sequence of the sequential elements comprising the communication to the second computing node.

10. The computer program product of claim 9, where the data related to or comprising each element of the sequential elements is selected from the group consisting of: contents and state information.

11. The computer program product of claim 9, wherein the invalidating the second element comprises an action selected from the group consisting of: truncating the communication, forcing bad parity, and forcing a bad checksum.

12. The computer program product of claim 9, wherein receiving the first element at the second computing node is contemporaneous with initiating the action based on the value.

13. A system comprising:

one or more memory;

one or more processors in communication with the memory; and program instructions executable by the one or more processors in a distributed delay constrained computing environment via the one or more memory to perform a method, the method comprising:

intercepting, by the one or more processors in the distributed delay constrained computing environment, in-line without an intermediary device, to perform intrusion detection, a communication between a first computing node and a second computing node, over a communications network of the delay constrained computing environment, wherein communications within the delay constrained computing environment are limited by a constraint to delays of one bit, wherein the communication is comprised of sequential elements, wherein the communication comprises a data packet, and wherein the sequential elements each comprise a pre-defined number of bits, and wherein the pre-defined number is less than a number of bits comprising the packet;

determining, by the one or more processors, based on data related to or comprising the sequential elements, if the communication is undesired, wherein the determining comprises:

evaluating, by the one or more processors, individually and separately, for integrity, prior to an occurrence of an event, data related to or comprising each element, wherein the communication is evaluated incrementally and separately element by element, wherein the evaluating of the communication comprises a delay of less than or equal to one bit, to comport with the constraint, the evaluating comprising, for each element of the sequential elements of the communication:

determining, by the one or more processors, that latency for evaluating the communication could exceed the constraint;

obtaining, by the one or more processors, only a first element of the sequential elements of the communication, in sequence, wherein the first element is an earliest element in the sequence that has not been evaluated;

determining, by the one or more processors, based on data related to or comprising the earliest element, that the data related to or comprising the earliest element indicate that the communication is desired;

based on determining that the data related to or comprising the earliest element indicate that the communication is desired, forwarding the first element to the second computing node;

speculating, by the one or more processors, based on a value of the first element of the communication, before obtaining a second element of the communication, possible values for the second element of the communication wherein the second element is an element subsequent and adjacent to the earliest element in the sequence, wherein one or more values of the possible values indicate that data related to or comprising the second element indicate that the communication is desired and one or more additional values of the possible values indicate that the communication is undesired, and wherein the one or more values and the one or more additional values together comprise all the possible values;

determining, by the one or more processors, based on the speculating, an action for handling the communication based on each value of the possible values, wherein the action is selected from the group consisting of: outputting the second element of the communication to the second computing node, and invalidating and outputting an invalidated second elements of the communication to the second computing node;

obtaining, by the one or more processors, the second element in the sequence, wherein the obtaining comprises identifying a value of the second element from the possible values and contemporaneously with the obtaining, initiating the action based on the value; and determining, by the one or more processors, the event has occurred; and based on the occurrence of the event, stopping, by the one or more processors, the evaluating of the communication, wherein the event is selected from the group consisting of: the invalidating of the second element and forwarding a final element in the sequence of the sequential elements comprising the communication to the second computing node.

14. The system of claim 13, wherein receiving the first element at the second computing node is contemporaneous with initiating the action based on the value.

* * * * *